US009396135B2

(12) United States Patent
Kavi

(10) Patent No.: US 9,396,135 B2
(45) Date of Patent: Jul. 19, 2016

(54) METHOD AND APPARATUS FOR IMPROVING COMPUTER CACHE PERFORMANCE AND FOR PROTECTING MEMORY SYSTEMS AGAINST SOME SIDE CHANNEL ATTACKS

(75) Inventor: Krishna M. Kavi, Carrollton, TX (US)

(73) Assignee: University of North Texas, Denton, TX (US)

( * ) Notice: Subject to any disclaimer, the term of this patent is extended or adjusted under 35 U.S.C. 154(b) by 0 days.

(21) Appl. No.: 13/458,145

(22) Filed: Apr. 27, 2012

(65) Prior Publication Data

US 2012/0297110 A1 Nov. 22, 2012

Related U.S. Application Data

(60) Provisional application No. 61/487,477, filed on May 18, 2011.

(51) Int. Cl.
| | |
|---|---|
| G06F 12/00 | (2006.01) |
| G06F 12/06 | (2006.01) |
| G06F 12/08 | (2016.01) |
| G06F 13/00 | (2006.01) |
| G06F 13/28 | (2006.01) |
| G06F 12/14 | (2006.01) |

(52) U.S. Cl.
CPC ........ *G06F 12/1408* (2013.01); *G06F 12/0864* (2013.01); *G06F 12/0897* (2013.01); *G06F 2212/1016* (2013.01); *G06F 2212/1052* (2013.01)

(58) Field of Classification Search
CPC ............ G06F 12/1408; G06F 12/0864; G06F 12/0897; G06F 2212/1016; G06F 2212/1052
USPC ...................... 711/5, 123, 173, 118, E12.041, 711/E12.018, 167, 3, 125, 126; 712/E9.055
See application file for complete search history.

(56) References Cited

U.S. PATENT DOCUMENTS

| | | | | |
|---|---|---|---|---|
| 5,694,567 | A * | 12/1997 | Bourekas et al. | 711/3 |
| 7,318,114 | B1 * | 1/2008 | Cypher | 711/3 |
| 2003/0074537 | A1 * | 4/2003 | Pang et al. | 711/202 |

(Continued)

OTHER PUBLICATIONS

François Bodin, et al., Skewed associativity enhances performance predictability, ACM SIGARCH Computer Architecture News, May 1995, vol. 23 Issue 2, pp. 265-274.*
Adamo, O. et al., "Smaller split L-1 data caches for multi-core processing systems", Proceedings of IEEE 10th International Symposium on Pervasive Systems, Algorithms and Networks (I-SPAN 2009), Dec. 2009, Kaohsuing, Taiwan.
Bernstein, D.J., "Cache-timing Attacks on AES," available at: http://cr.yp.to/antiforgery/cachetiming-20050414.pdf.

(Continued)

*Primary Examiner* — Mark Giardino, Jr.
*Assistant Examiner* — Shane Woolwine
(74) *Attorney, Agent, or Firm* — Daniel J. Chalker; Edwin S. Flores; Chalker Flores, LLP

(57) ABSTRACT

A physical cache memory that is divided into one or more virtual segments using multiple circuits to decode addresses is provided. An address mapping and an address decoder is selected for each virtual segment. The address mapping comprises two or more address bits as set indexes for the virtual segment and the selected address bits are different for each virtual segment. A cache address decoder is provided for each virtual segment to enhance execution performance of programs or to protect against the side channel attack. Each physical cache address decoder comprises an address mask register to extract the selected address bits to locate objects in the virtual segment. The foregoing can be implemented as a method or apparatus for protecting against a side channel attack.

43 Claims, 4 Drawing Sheets

(56) References Cited

U.S. PATENT DOCUMENTS

| | | | |
|---|---|---|---|
| 2008/0059711 A1* | 3/2008 | McKeen et al. | 711/129 |
| 2008/0162816 A1* | 7/2008 | Buxton et al. | 711/118 |
| 2008/0229026 A1* | 9/2008 | Chung | 711/132 |
| 2009/0055612 A1* | 2/2009 | Sibert | 711/163 |
| 2009/0164730 A1* | 6/2009 | Harikumar et al. | 711/129 |
| 2010/0180083 A1* | 7/2010 | Lee et al. | 711/128 |
| 2010/0228939 A1* | 9/2010 | Lee et al. | 711/168 |

OTHER PUBLICATIONS

Givargis, T. "Zero cost indexing for improved processor cache performance", ACM Transactions on Design Automation of Electronic Systems, vol. 11, No. 1, pp. 3-25, 206.

Naz, A., "Tiny split data caches make big performance impact for embedded applications", Journal of Embedded Computing (IOS Press), vol. 2, No. 2 (Nov. 2006), pp. 207-219.

Page, D., "Partitioned Cache Architecture as a Side-Channel Defense Mechanism", Cryptology ePrint Archive, Report 2005/280, 2005.

Patel, K., et. al. "Reducing cache misses by application-specific reconfigurable indexing", Proc. of the 2004 IEEE/ACM International Conference on Computer Aided Design (ICCAD '04), pp. 125-130.

Peir, J.-K., et al. "Capturing dynamic memory reference behavior with adaptive cache topology", Proc. of Eight ACM Conference on Architectural Support for Programming Languages and Operating Systems (ASPLOS VIII), pp. 240-250, 1998.

Percival, C. "Cache Missing for Fun and Profit," available at: http://www.daemonology.net/papers/htt.pdf.

Srikantaiah, S., et al., "Adaptive Set Pinning: Managing shared caches in chip multiprocessors", Proc. of ACM ASPLOS XIII, Mar. 2008, Seattle, WA, pp. 135144.

Wang, Z., et al., "New cache designs for thwarting software cache-based side channel attacks", Proceedings of the ACM International Symposium on Computer Architecture (ISCA-07), Jun. 2007.

Zhang, C., "Reducing cache misses through programmable decoders", ACM Transactions on Architecture and Code Optimizations (TACO), VOI4, No. 4, Article 24, Jan. 2008.

* cited by examiner

METHOD AND APPARATUS FOR IMPROVING COMPUTER CACHE PERFORMANCE AND FOR PROTECTING MEMORY SYSTEMS AGAINST SOME SIDE CHANNEL ATTACKS

CROSS-REFERENCE TO RELATED APPLICATIONS

This application claims priority to U.S. Provisional Application Ser. No. 61/487,477, filed May 18, 2011, and entitled "Method and Apparatus for Improving Computer Cache Performance and for Protecting Memory Systems Against Some Side Channel Attacks", the entire contents of which are incorporated herein by reference.

FIELD OF THE INVENTION

The present invention relates generally to the field of computer memory systems and, more particularly, to a method and apparatus both for improving execution performance and for protecting memory system against some side channel attacks.

BACKGROUND OF THE INVENTION

Current methods use a single circuit to decode an object memory address for finding a location in computer cache memories for storing and retrieving the object as a program is executed on computer processors (or cores). This causes most program objects to be stored in only very few cache memory locations, leading to underutilization of the cache memories and underperformance.

Current methods for keeping information secure and private rely on encrypting data with a cryptographic algorithm. Data confidentiality assures that the information is revealed to only authorized users. Encrypting data ensures that even if the unauthorized users get hold of the data they will not be able to extract any useful information, unless they have the key with which the data was encrypted. This leads to attempts (or attacks) to obtain the secret key. The attacks can be direct or indirect (side channel). They can be brute force or based on an understanding on how computer systems execute instructions and how information is stored internally in processor memory systems.

As shown in FIG. 1, computer systems or devices 100 containing one or more processors 102 typically use physical cache memory 104 to reduce the average time to access physical main memory 106. In modern computer implementations, additional levels of cache memories are employed between the physical main memory 106 and processor(s) 102. The cache memory 104 is communicably coupled to the processor 102 with a high-speed bus 108. The main memory 106 is communicably coupled to the processor 102 and the cache memory 104 with any suitable communication mechanism. The physical cache memory 104 includes data 110 and corresponding tags 112, identifying a part of the address to which the data belongs. One possible configuration of computer systems or devices 200 with multiple cache memories is shown in FIG. 2, but other configurations are possible. As shown in FIG. 2 some caches 202, often referred to in trade as Level-1 caches, are tightly coupled with a single processor (or core) 102 such that only that processor (e.g., 102a) can use the cache (e.g., 202a) for storing its program objects. Other caches 204, referred to in trade as Level-2, Level-3 and Last Level Caches (LLC), are normally shared by more than one processor (or cores).

To simplify the explanation of the following figures, and without loss of generality, the presence of a single cache memory (as shown in FIG. 1) will be assumed. Although not shown in the following figures, the cache memory 104 is communicably coupled to the processor 102 with a high-speed bus. The memory 106 is communicably coupled to the processor 102 and the cache memory 104 with any suitable communication mechanism. Referring to FIG. 3, computer memory systems 300, in general, and cache memories 104 in particular use a selected portion of an object address 302 to locate the object in the cache memory 104. Typically address bits from the lower end of the object address 302 are used for this purpose and these bits collectively are known as the Set Index 304; these bits are used as an index into the cache memory 104 to locate one or more memory locations (collectively called a cache set). Then, the "tag" bits 110 stored at these locations are compared with the tag bits 306 of the object address 302 to verify that at least one of the data items currently stored in the identified set of cache memory locations is the object being sought. The byte address bits 308 of the object address 302 are used to extract the needed data from the cache contents 108. A cache miss results if none of the tag bits 110 of the locations in the cache set match the address tag bits 306 of the object address 302. Then higher-level memories (including higher level caches and DRAM "main" memories) are consulted to obtain the missing object.

Selecting index bits from an address to define an address decoding can impact the cache accesses in terms of hits and misses. Extensive studies exist which show that selecting lower end bits for the set index 304, as done in most current implementations, can lead to non-uniform cache accesses. In other words, very few cache sets (or cache memory locations) receive most accesses, and these accesses can cause conflicts and thus increase cache misses, leading to poor execution performance. This behavior also implies that increasing the cache size does not lead to improved performance since only a small portion of the cache memory is utilized. There have been proposals to more uniformly distribute cache accesses. These proposals can be categorized into two groups. The first group proposes to select address bits as a cache set index such that addresses are randomly distributed among all cache sets (for example [3], [7]). The second group proposes to dynamically remap addresses from heavily utilized cache sets to underutilized cache sets (for example [8], [12]).

In other implementations, cache memories are partitioned and each portion is dedicated for a specific program object (such as array caches and scalar caches, [1], [5]), or each partition is dedicated for a specific function (such as system cache and user caches).

Current implementations of set associative cache involve grouping two or more cache memory locations (referred in the trade as cache lines or cache blocks) into a single set (as shown in FIG. 2). All the cache memory locations in a set have a single set index, and the set is located using common set index bits from memory addresses. The addresses of the cache lines within a set differ in a few higher bits located beyond the set index bits. While grouping several cache lines into a single set helps in removing some cache conflicts, the current implementations do not significantly improve the utilization of cache memories, unless the cache memory is designed as a fully associative cache. In a fully associative cache, all cache lines are grouped into a single set, requiring an exhaustive search through the cache to locate a needed program object. This would require very complex hardware apparatus.

A side channel attack is any attack that is based on information gained by observing (application) behaviors without actually interfering with an application (or modifying the application code in some manner). Observing execution times or energy consumed by applications, acoustic cryptanalysis, and differential fault analysis are among widely used side channel attacks. Timing attack is a form of attack that is relatively easy to perform by measuring how much execution time elapses for certain computations. Any unauthorized user can perform a cache-based side channel attack by measuring execution times for cache misses and thus retrieve keys vital for encryption algorithms to work. As illustrated in prior research [11] users can retrieve RSA and AES keys by performing such simple attacks with relative ease.

Presently, virtually every computer system uses caches. Thus, exploits based on cache attacks can impact a wide array of systems. Because they are easy to perform, adaptable to a wide range of systems, and require little resources to apply, software cache-based side channel attacks are a very appealing new form of system attacks. Current methods to alleviate cache-based attacks are attack specific and no general solutions have been available.

The Percival's attack [9] is a side channel attack. Encryption algorithms use parts of the private key (or blocks of the key) to index a table of pre-computed constants. These constants are used in encoding a plain text. If the attacker knows the address of the table used at any given step, he will know a part of the private key, since that part is used to address the table of constants when stored in cache.

If the attacker can cause cache misses when the table is accessed, the attacker can decode the addresses of the table entries (because the attacker knows the part of the address—or cache set index—that is the address of the table index). By causing cache misses (by running a thread concurrently with the victim thread) the attacker is able to assemble the private key, piece by piece.

The Bernstein's attack [2] is a side channel attack that depends on specific bits of the key that caused cache misses by measuring memory access times. This attack is based on the AES algorithm internals. It uses a part of the key and a part of the plain text. The bits from the key and plain text are Exclusive-Ored, and the result is used to index a table. Thus to find the hidden key the attacker does the following: assuming that the same table entry will cause a cache miss when accessed, one can observe which entry caused the cache miss by measuring execution time averages—cache misses causes longer execution times. The attack is performed in two steps. First, the attacker will use a known key and a very long plain text. This will ensure that the plain text contains all possible bit combinations when blocks of the plain text are used. The attacker then observes which known key combination and plain text combination caused cache misses. The second phase is to use another plain text and an unknown key to observe cache misses. Assuming that the cache miss is for the same value (as a result of the Exclusive-Or of the key and plain text) as that from the known key and known plain text, one can easily determine the bits of the unknown key.

Wang and Lee [11] propose two solutions to thwart the above attacks. In the first, cache lines are locked and cannot be evicted. This technique can be used to lock data used by encryption algorithms so that an attacker will never be able to stitch the key. This method is similar to the partitioned caches proposed in [6] to block side-channel attacks. The other solution proposed by Wang and Lee [11] is based on randomizing data placement and replacement policy. The randomization uses a table of permutations as shown in FIG. 4. The size of the table is equal to the number of sets in a cache memory. Each entry contains a new set address. It works as follows.

The set-index bits of an address obtained using conventional cache addressing methods as described previously, are used to find an entry into the permutation table. The table provides modified set indexes that are used to access cache. The new replacement policy works as follows. Assuming that a k-way set associative cache is provided (that is k-cache memory locations are grouped into a single set), even if the attacker knows which set caused a cache miss, by randomly selecting one of the k lines of the set the attacker will not be able to identify the address of the line (since log(k) bits corresponding to the lines in a set are not decodable). Use of a fully associative cache, wherein all cache locations are grouped into a single set, is a generalization of this solution.

Wang and Lee [11] show how their designs can prevent the two types of attacks. It is easy to see that if you use locked cache lines, the first type of attack (Percival's attack) is not possible. If no other process can displace locked data, no information about which address is used for the table of constants is revealed. The solution to the second type of attack (Bernstein's attack) is based on the reasoning that since cache address mapping and replacement of lines within a set are randomized, the attacker cannot assume that the same value resulting from the Exclusive-Or of key and plain text will result in a cache miss. Wang and Lee's solutions come at a performance degradation and hardware cost. Locking cache sets for a specific application may lead to underutilization of the cache. The RP (random permutations) cache (FIG. 4) requires an additional access to the permutation table before cache could be read, lengthening the critical path from CPU to cache memory. Moreover, on a cache miss, it will be necessary to reverse the permutation (i.e., look up a table to find the original set index) so that a missing data could be brought from higher level memories into cache.

As a result, there is a need for a method and apparatus for protecting memory systems from a side channel attack that sustains system performance, which is flexible and does not require substantial hardware additions.

SUMMARY OF THE INVENTION

The present invention provides a method and apparatus to both improve the utilization of cache memories and to thwart some side channel memory attacks. By using multiple circuits to map program objects into cache memories (these circuits are referred to as address decoders), the present invention provides a solution that yields low probabilities of successful attacks and sustains or even improves potential performance benefits. The use of multiple decoders offers the same goals as those achieved by other efforts to overcome side channel memory attacks; however, the present invention incurs very minimal hardware additions and it comes with an even greater flexibility.

Previous systems did not explore the use of multiple circuits (or multiple decoders) to map memory addresses of objects to cache memory sets (or locations). The present invention uses multiple decoders such that each decoder uses different address bits as set index, and each decoding method can be customized to each complex program object or program segment (or functions, procedures), or in case of shared cache memories, to different tasks or processors (or cores). Multiple address decoders can also be used to create very general and flexible set associative cache memories. Each decoder is used to locate one element of a set. Moreover, the present invention can be used with all cache memories.

The present invention provides a method to more uniformly place program objects in cache memories and to avoid cache misses, thus improving program execution speeds.

Each processor core is provided with a private cache (or Level-1 cache). The cache is divided into one or more virtual segments. An address mapping is selected for each virtual segment. This is achieved by using two or more circuits (two or more address decoders) for translating memory addresses into cache locations. Each decoder will utilize different address bits as its set index. Each physical cache address decoder includes an address mask register to extract the selected address bits to comprise its set index for locating objects in the virtual segment. The set index bits can be selected based on a specific program object (such an array or structure element used to store complex program data). The method for selecting the address bits for a set index can be based on any of a number currently known methods (for example [3] or [7]); and these methods can be implemented in software.

Another invention described herein permits the use of multiple address decoders to generalize set associative addressing of cache memories. Using two or more address decoders, it is possible to group two or more cache locations (or cache lines) into a set. Each different decoder identifies one member of a cache set. This method can lead to the distribution of memory addresses randomly and uniformly across the cache memory locations. Moreover, unlike current implementations of set associative caches (as shown in FIG. 3), a set can comprise any number of elements, not just a number that is a power of 2.

The present invention provides a method where multiple decoders can also be applied to higher-level cache memories (such as Level-2, Level-3 and Last Level Caches), to minimize cache conflicts among different programs (or tasks) running on different processor cores. Each higher-level cache is partitioned into two or more virtual partitions. This is achieved by using two or more address decoders with higher-level cache memories. Each decoder will utilize different address bits as its set index. Each physical cache address decoder includes an address mask register to extract the selected address bits to locate objects in the virtual segment. The set index bits can be selected based on a specific program or task running on a different processor core. The method for selecting the address bits for a set index can be based on any of a number currently known methods (for example [3], [7]). These methods can be implemented in software.

The present invention provides a method for protecting against a side channel attack. A physical cache memory is provided. The physical cache memory is divided into one or more virtual segments. An address mapping is selected for each virtual segment. Some virtual segments are dedicated for encryption programs. The address mapping includes two or more address bits as set indexes for the virtual segment and the selected address bits are different for each virtual segment. A cache address decoder is provided for each virtual segment to protect against the side channel attack. Each physical cache address decoder includes an address mask register to extract the selected address bits to locate objects in the virtual segment. The method for selecting the address bits for a set index (or setting the mask register) can be based on any of a number currently known methods (for example [3], [7]), or made random. These methods can be implemented in software.

In addition, the present invention provides a physical cache memory that is protected against a side channel attack that includes a physical cache memory, an address mapping for each virtual segment, and a cache address decoder for each virtual segment to protect against the side channel attack. The physical cache memory divided into one or more virtual segments. An address mapping for each virtual segment wherein the address mapping includes two or more address bits as set indexes for the virtual segment and the selected address bits are different for each virtual segment. The address mapping associated with address decoders can be changed periodically or on program context switches.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to computer memory systems, but it will be understood that the concepts of the present invention are applicable to any device having a processor and memory.

The present invention provides a method and apparatus to improve the utilization of processor memories, thus improving the performance of computer processors, and to thwart some side channel memory attacks. By using multiple cache address decoders, the present invention provides a solution that yields low probabilities of successful attacks and sustains or even improves potential performance benefits. The use of multiple decoders offers the same goals as those achieved by other efforts to overcome side channel memory attacks (e.g., Percival and Bernstein attacks); however, the present invention incurs very minimal hardware additions and it comes with an even greater flexibility. More importantly the present invention does not extend the critical path between CPU and Caches. Moreover, the present invention can achieve higher levels of performance than previous solutions that either lock cache sets or physically split caches. The present invention provides for very general and flexible apparatus than any previous approaches to improve the distribution of program objects and reduce cache conflicts.

Figure 6:
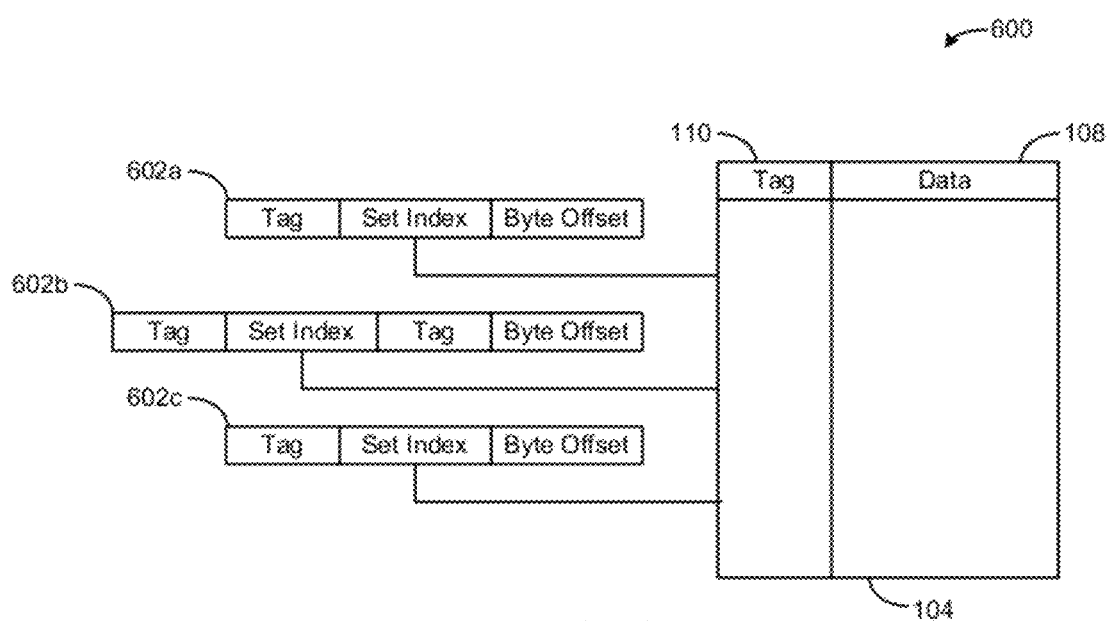
FIG. 6 is a block diagram of multiple decoders used with a single cache address in accordance with one embodiment of the present invention.

The present invention uses different bit combinations of an object address for Set Index instead of the same lower end bits as used in today's processors (as shown in FIG. 6). In fact, different address bits can be used as the set index for different objects, or for different applications, different tasks or different processor cores. The use of different address bits for set index will spread objects across cache memories, leading to more uniform utilization of cache memory entries. In addition, this will also thwart some cyber security attacks aimed at discovering secret keys; such attacks rely on the fact that cache memories always use the same lower bits of object's address to locate data, and by randomly selecting and changing address maps used by different address decoders, the task of side-channel attack is made very difficult. Computer control software (such as operating systems, compilers and application run-time systems) can randomly select different address bits to form a set-index. It is not necessary to choose consecutive bits for set-index, unlike the current methods used for addressing memory systems.

A cache decoder is a hardware circuit that maps an address to a location (or set index) in (cache) memory [4]. Since caches are smaller than DRAMs and Disk memories, not all bits of the address are used to identify a location in the cache. Mapping an address to a cache set relies on using a portion of the address. Consider an address space of $2^N$ bytes (i.e., each program object is identified by N address bits), and a cache with $2^n$ line, each containing $2^b$ bytes for a total data capacity of $2^{(n+b)}$ bytes. Then use m bits out of the N address bits to locate a set with k lines (k-way associative) where m=(n−log$_2$ (k)); and use b additional bits to locate a byte, leaving (N−m−b) bits as the tag. Using different m bits of the address will change how the addresses are mapped to the cache. Changing b can modify the cache line size, changing k can vary set associativity, and changing n can change the capacity for each partition.

Figure 1:
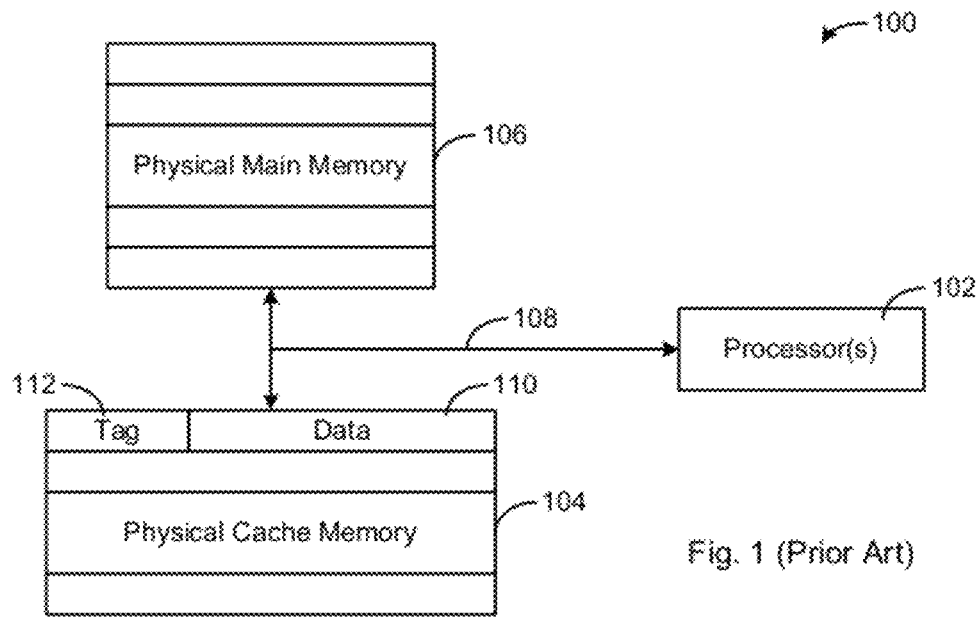
FIG. 1 is a block diagram of a typical memory system in accordance with the prior art.
Figure 2:
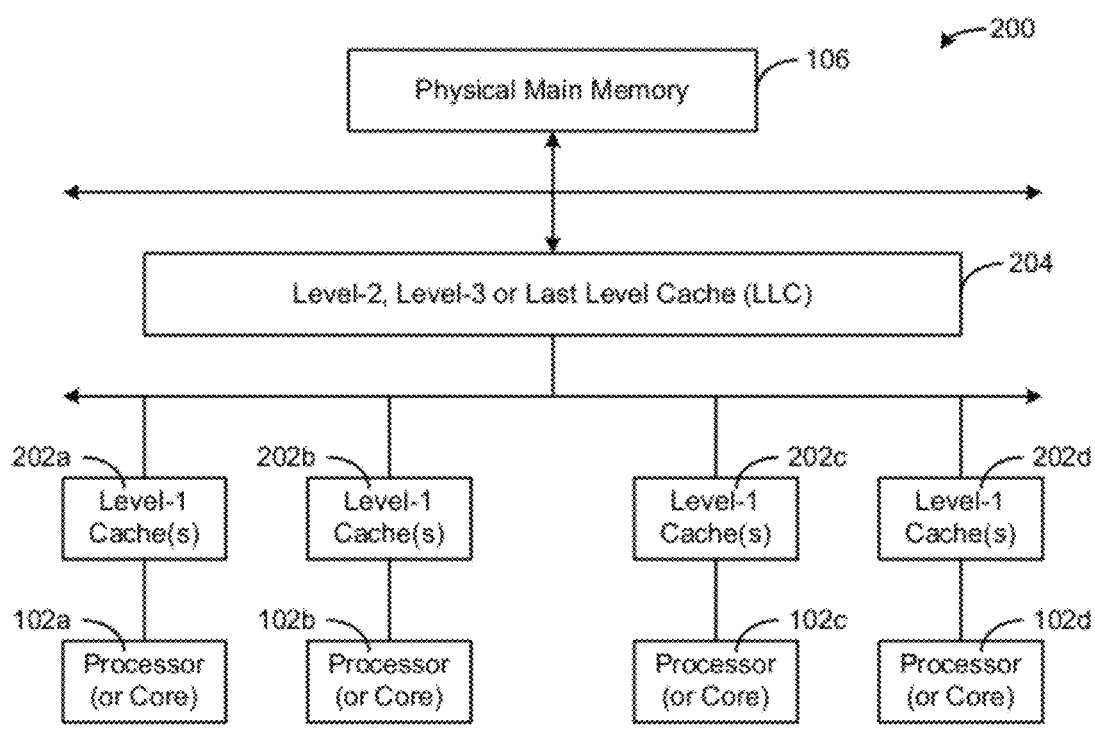
FIG. 2 is a block diagram of multi-level cache memory systems in accordance with the prior art.
Figure 3:
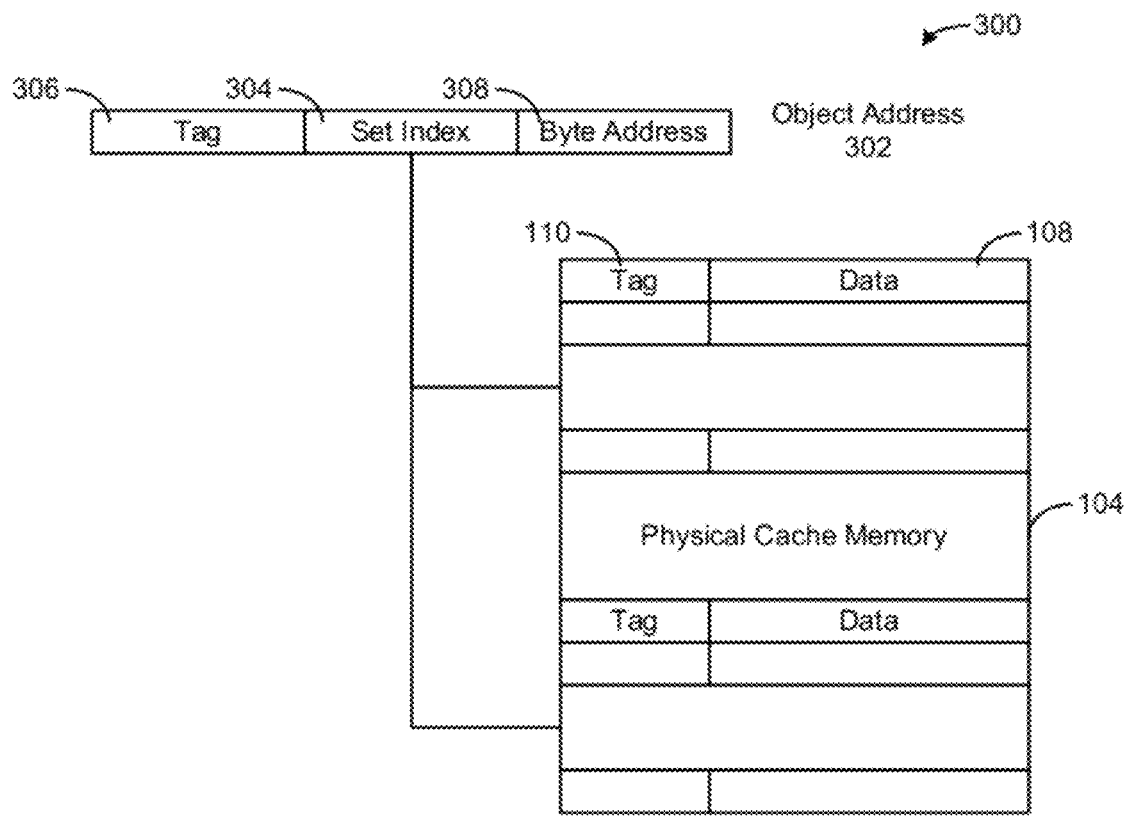
FIG. 3 is a block diagram of set associative cache memory addressing in accordance with the prior art.
Figure 4:
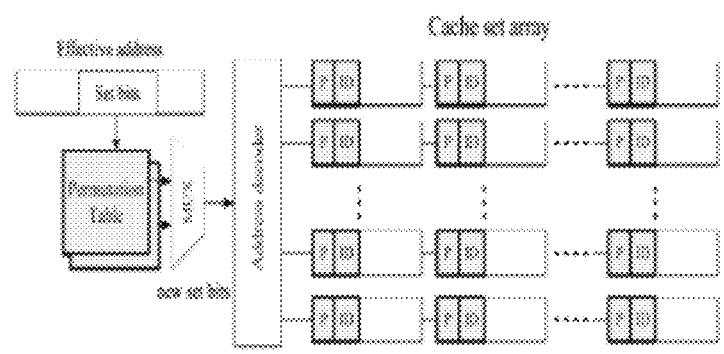
FIG. 4 is a logical view of Wang and Lee's RP Cache in accordance with the prior art.
Figure 5:
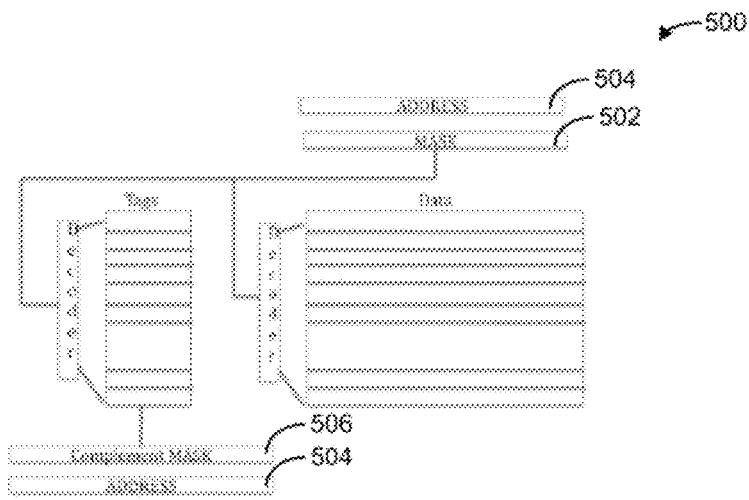
FIG. 5 is block diagram of address decoding using masks in accordance with one embodiment of the present invention.

For example, as shown in FIG. 5, the selection of different address bits for Set Index can be achieved using a "mask" 502: a mask consists of "1s" in bit positions comprising the desired set index positions, and "0s" in all other bit positions. The mask 502 is "ANDed" with the object address 504 to extract bits comprising the Set Index. Special registers, called Mask Registers can be included in the processor hardware along with instructions to load new mask values into these registers so that control software can choose and dynamically change the bits for Set Index. The complement mask 506 is "ANDed" with the object address 504 to extract bits comprising the tag. In today's architectures the decoder locates a cache line for an address by using a portion of the address. The bits used by the decoder are constant. However, by masking the address through a mask register, as shown above, one can chose which bits of the address will be used by the decoder, thus the bits used for decoding need not remain fixed. It is very simple to add multiple address decoders with a single cache, each decoder provided with a different mask register.

Now referring to FIG. 6, a block diagram of multiple decoders used with a single cache address in accordance with one embodiment of the present invention 600 is shown. Each decoder (e.g., 602a, 602b and 602c) can be dedicated to a specific function, task or even an object type (such as an array). By using masks to create multiple decoders 602 the same goals can be achieved at an even greater flexibility then the proposed solutions by Wang and Lee [8]. By dedicating a decoder 602 to encryption algorithms, the same goals of locking cache sets can be achieved. However, unlike locking cache sets, the present invention does not reserve cache sets to a specific task, potentially leading to better utilization of caches. By randomly selecting different decoders 602 (i.e., different masks) for different tasks or functions within a task, the same goals as the randomizing cache set indexes can be achieved. Moreover, one can consider changing the masks used by a decoder on every context switch of a program to further randomize the set indexes Current technology can easily include several hardware address decoders-2, 4, 8, or even 16 decoders is not unreasonable. This in turn gives us greater flexibility because we are able to dedicate different decoders to different tasks, processes, or threads. This concept achieves two goals. Firstly, it improves security because different applications will use different decoders, and hence different bits of the addresses to access cache sets. Even if an attacker causes a cache miss on an entry as described in [2] and [9] he has no way of knowing if the Set Index bits are the same as that of the application he is trying to break. Assuming he does know the mapping of the decoders, the probability of identifying the bits comprising Set Index can be minimized by (a): changing the decoding on process context switches, or (b) by not selecting consecutive bits of an address for Set Index. Moreover, one may use the decoders to gain performance. As described previously, methods for selecting address bits comprising a set index to more uniformly distribute cache memory accesses are known (for example [3], [7]). However, all known prior art use a single decoder and hence a single set index for the entire execution of a program. Using a number of decoders can improve cache utilization and reduce cache misses. And different decoders can choose different address bits as set indexes thus facilitating the simultaneous existence of multiple address mappings during a single program execution. The use of multiple decoders requires no permutation table or dynamic remapping of a set index into a new index and thus improves the critical path between the processor and cache.

Figure 7:
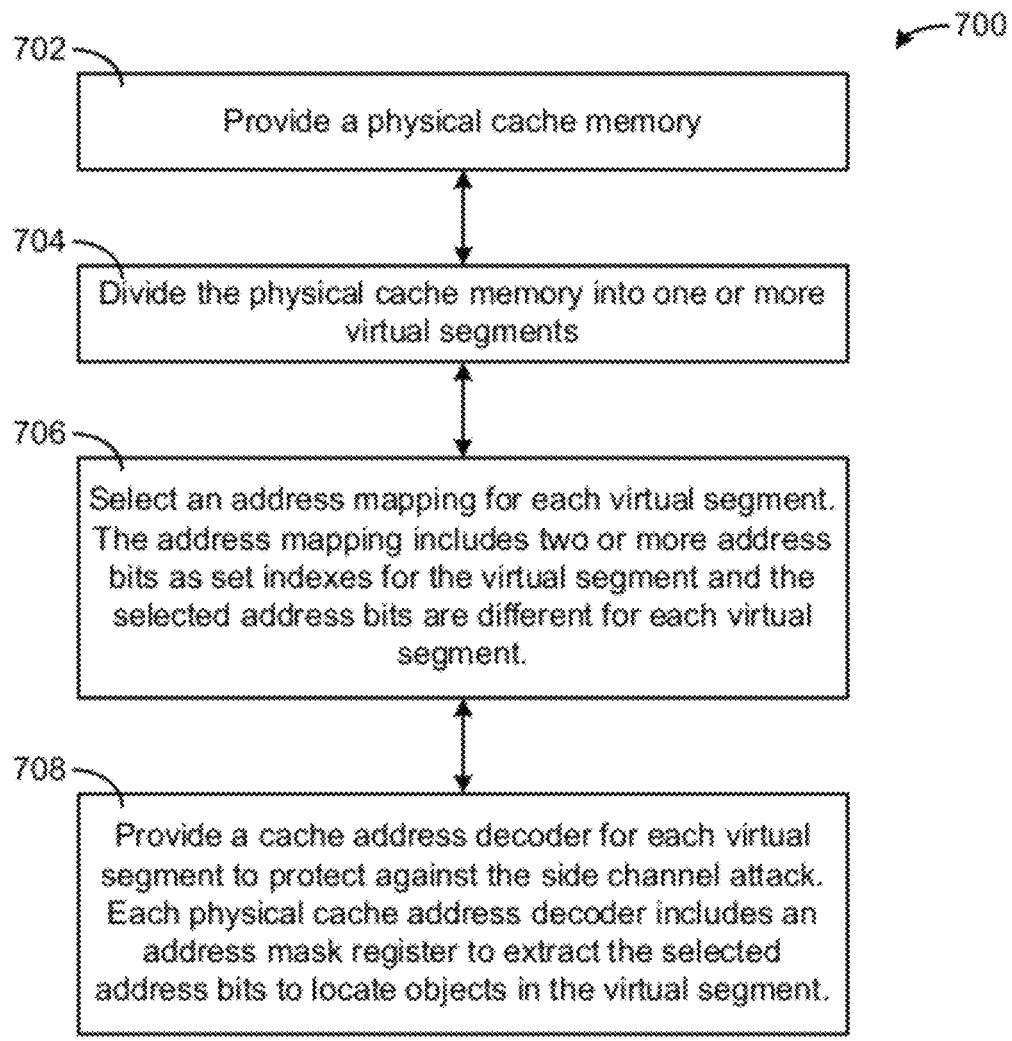
FIG. 7 is a flow chart of a method for protecting against a side channel attack in accordance with one embodiment of the present invention.

Referring now to FIG. 7, a flow chart of a method 700 for protecting against a side channel attack (e.g., Percival's Attack or Bernstein's Attack) and improving the utilization of cache memories is shown. A physical cache memory is provided in block 702. The physical cache memory can be a L-1 cache, a L-2 cache, a L-3 cache, a Last Level Cache (LLC), a main memory or other type of memory. The physical cache memory is divided into one or more virtual segments in block 704. An address mapping is selected for each virtual segment in block 706. The address mapping includes two or more address bits as set indexes for the virtual segment and the selected address bits are different for each virtual segment. A cache address decoder is provided for each virtual segment to protect against the side channel attack in block 708. Each physical cache address decoder includes an address mask register to extract the selected address bits to locate objects in the virtual segment.

The cache address decoders can be programmable, by changing the mask used for selecting set index. The selected set index bits need not be consecutive bits, Furthermore, the selection of the address mapping can be preset, dynamic, or based on one or more criteria which can be based on program specific behaviors.

The present invention provides a physical cache memory with two or more address mappings wherein the address mapping includes two or more address bits as set indexes and a cache decoder for each address mapping to improve the utilization of the cache memory. Each physical cache address decoder includes an address mask register to extract the selected address bits to locate objects in the physical cache memory. Additional method steps may include: (a) randomly selecting the cache address decoders for different functions of a program, different applications, different tasks, different objects of the program, different processes, different threads in a multithreaded processor, or different cores in a multicore system; or (b) changing the address mask register on a process context switch. Note that the cache address decoders can implement "skewed" associativity, whereby the elements of a set are identified using different decoders. Finally, each virtual segment associated with a decoder can be: (a) restricted to a fixed number of cache sets; (b) allowed to encompass the cache memory in its entirety, or (c) allowed to bleed into other virtual segments when necessary. The foregoing method can be implemented in software.

In addition, the present invention provides a physical cache memory that is protected against some side channel attacks that includes a physical cache memory that is divided into one or more virtual segments, an address mapping for each virtual segment, and a cache address decoder for each virtual segment to protect against the side channel attack. An address mapping for each virtual segment wherein the address mapping includes two or more address bits as set indexes for the virtual segment and the selected address bits are different for each virtual segment. Each physical cache address decoder includes an address mask register to extract the selected address bits to locate objects in the virtual segment.

The present invention provides a device to improve the performance that includes one or more processors (or cores) a physical memory communicably coupled to the processors, at least one physical cache memory communicably coupled to the processor and the physical memory, which is divided into one or more virtual partitions, an address mapping associated with each virtual partition, and a cache decoder for each virtual cache partition. An address mapping for each virtual segment wherein the address mapping includes two or more address bits as set indexes for the virtual segment. The selected address bits can be different for each virtual segment. Each physical cache address decoder includes an address mask register to extract the selected address bits to locate objects in the virtual segment. The device can be a computer, a server, a laptop, a desktop, a portable computer, a workstation, a communications device, a personal data assistant, a mobile phone, a gaming console, an entertainment device, an appliance, a vehicle, a security system, or any type of computerized device.

The present invention also provides a device that is protected against a side channel attack that includes a processor, a physical memory communicably coupled to the processor, at least one physical cache memory communicably coupled to the processor and the physical memory, an address mapping for each virtual segment, and a cache address decoder for each virtual segment to protect against the side channel attack. The physical cache memory divided into one or more virtual segments. Some virtual segments are dedicated to protected programs and encryption segments or functions. An address mapping for each virtual segment wherein the address mapping includes two or more address bits as set indexes for the virtual segment and the selected address bits are different for each virtual segment. Each physical cache address decoder includes an address mask register to extract the selected address bits to locate objects in the virtual segment. The device can be a computer, a server, a laptop, a desktop, a portable computer, a workstation, a communications device, a personal data assistant, a mobile phone, a gaming console, an entertainment device, an appliance, a vehicle, a security system, or any type of computerized device.

The probability of a successful attack will now be discussed. Consider a system with n address bits and m bits used as cache set index (which will be the number of "1" in our mask). The probability that the victim and attacker application are using the same mask (they must in order to have a successful attack) is given by:

$$\frac{1}{_nC_m} = \frac{1}{\frac{n!}{m!(n-m)!}} = \frac{m!(n-m)!}{n!}$$

since we m bits selected out of n bits for an set Index. The probability that the m-set index bits are identical is $$\frac{1}{2^m}.$$

Thus the probability of successful attack is given by $$\frac{m!(n-m)!}{(n!)*2^m}$$

Switching the mask on context switches further minimizes the probability of a successful attack. However this may pose some performance penalties since the contents of the cache are not accessible after a context switch using a new mask.

The probability of a successful attack against the solution presented by Wang and Lee [1] using a permutation table depends on the number of permutations during the decoding process. As stated previously, the solution proposed in [11] adds an additional level of indirection in decoding the address to locate an object in cache memory. The present invention does not. Furthermore, the solution in [11] also requires reversing of the permutation to handle cache misses to convert permuted cache address back to memory address. The present invention does not require such a reverse translation.

It will be understood by those of skilled in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

REFERENCES

[1] O. Adamo, A. Naz, K. Kavi and T. Janjusic. "Smaller split L-1 data caches for multi-core processing systems", Proceedings of IEEE 10th International Symposium on Pervasive Systems, Algorithms and Networks (I-SPAN 2009), December 2009, Kaohsuing, Taiwan

[2] D. J. Bernstein, "Cache-timing Attacks on AES," available at: http://cr.yp.to/antiforgery/cachetiming-20050414.pdf

[3] T. Givargis. "Zero cost indexing for improved processor cache performance", *ACM Transactions on Design Automation of Electronic Systems*, Vol. 11, No. 1, pp 3-25, 206.

[4] J. Hennessy and D. Patterson. Computer Architecture: A quantitative approach, 4th edition, Morgan Kauffman Publisher, San Francisco, Calif., 2007.

[5] A. Naz, K. Kavi, W. Li and P. Sweany. Tiny split data caches make big performance impact for embedded applications, Journal of Embedded Computing (IOS Press), Vol. 2, No. 2 (November 2006), pp 207-219.

[6] D. Page, "Partitioned Cache Architecture as a Side-Channel Defense Mechanism", Cryptology ePrint Archive, Report 2005/280, 2005.

[7] K. Patel, et. al. "Reducing cache misses by application-specific reconfigurable indexing", *Proc. of the* 2004 *IEEE/ACM International Conference on Computer Aided Design (ICCAD '04)*, pp 125-130.

[8] J.-K. Peir, Y. Lee and W. H. Hsu. "Capturing dynamic memory reference behavior with adaptive cache topology", Proc. of *Eight ACM Conference on Architectural Support for Programming Languages and Operating Systems (ASPLOS VIII)*, pp 240-250, 1998.

[9] C. Percival, "Cache Missing for Fun and Profit," available at: http://www.daemonology.net/papers/htt.pdf

[10] S. Srikantaiah, M. Kandemir and M. J. Irwin. Adaptive Set Pinning Managing shared caches in chip multiprocessors, Proc. of ACM ASPLOS XIII, March 2008, Seattle, Wash., pp 135144.

[11] Z. Wang and R. Lee. "New cache designs for thwarting software cache-based side channel attacks", Proceedings of the ACM International Symposium on Computer Architecture (ISCA-07), June 2007.

[12] C. Zhang. Reducing cache misses through programmable decoders, ACM Transactions on Architecture and Code Optimizations (TACO), V014, no. 4, Article 24, January 2008.

What is claimed is:

1. An apparatus comprising:
    one or more processors or cores;
    a physical memory communicably coupled to the processor(s) or core(s), wherein each location within the physical memory has a physical memory address;
    one or more physical cache memories communicably coupled to the processor(s) and the physical memory;
    two or more address mappings associated with each physical cache memory, wherein each of the two or more address mappings divide the physical memory address into at least a first set of address bits and a second set of address bits, the first set of address bits comprising a combination of two or more address bits from the physical memory address that are used as a set index to locate a program object in the physical cache memory, the second set of address bits are used as a tag to correctly identify a data in the physical cache memory with the physical memory address, a total number of bits used as the set index is less than a total number of bits in the physical memory address and the set index for the two or more address mappings are different;
    an address decoder associated with each address mapping; and
    a programmable address mask register with each address decoder that extracts (a) the set index from the physical memory address of the program object using changeable mask values which identify the address bits of the set index, and (b) the tag from the physical memory address of the program object using a complement of the changeable mask values which identify the address bits of the tag.

2. The apparatus as recited in claim 1, wherein the changeable mask values are chosen and/or changed by a control software.

3. The apparatus as recited in claim 1, wherein the changeable mask values are preset, selected at random, dynamically selected or selected based on one or more criteria.

4. The apparatus as recited in claim 1, wherein the changeable mask values are chosen to minimize conflicts in the placement of data in cache memories.

5. The apparatus as recited in claim 1, wherein the changeable mask values are chosen to create a plurality of cache partitions, each partition dedicated to a specific object, function, task or processor (core).

6. The apparatus as recited in claim 5, wherein each address mapping created by the changeable mask values is restricted to a portion of the physical cache memory, thus creating multiple partitions within a cache and each partition may be dedicated for a specific object, function, program segment, task or processor.

7. The apparatus as recited in claim 1, wherein the address mappings associated with the address decoders are used to collectively create a set associative cache memory.

8. The apparatus as recited in claim 7, wherein the set associative cache includes any number of elements using as many address decoders as needed.

9. An apparatus comprising:
    one or more processors or cores;
    a physical memory communicably coupled to the processor(s) or core(s), wherein each location within the physical memory has a physical memory address;
    a physical cache memory (Level 1 cache) communicably coupled to each of the processors;
    two or more address mappings associated with each physical cache memory, wherein each of the two or more address mappings divide the physical memory address into at least a first set of address bits and a second set of address bits, the first set of address bits comprising a combination of two or more address bits from the physical memory address that are used as a set index to locate a program object in the physical cache memory, the second set of address bits are used as a tag to correctly identify a data in the physical cache memory with the physical memory address, a total number of bits used as the set index is less than a total number of bits in the physical memory address bits and the set index bits for the two or more address mappings are not identical;
    an address decoder associated with each address mapping; and
    a programmable address mask register with each address decoder that extracts (a) the set index from the physical memory address of the program object using changeable mask values which identify the address bits of the set index, and (b) the tag from the physical memory address of the program object using a complement of the changeable mask values which identify the address bits of the tag.

10. The apparatus as recited in claim 9, wherein one of the cache address decoders of each Level-1 cache is dedicated to one or more encryption algorithms to prevent one or more side channel attacks.

11. The apparatus as recited in claim 10, wherein the changeable mask values for the programmable address mask register associated with the address decoder dedicated for the encryption algorithm(s) is hidden.

12. The apparatus as recited in claim 10, wherein the changeable mask values for the programmable address mask register of the dedicated address decoder is modified periodically or on program context switches.

13. The apparatus as recited in claim 9, wherein each of the plurality of decoders associated with each Level-1 cache is dedicated to a specific program object or data structure.

14. The apparatus as recited in claim 13, wherein the changeable mask values for the programmable address mask registers associated with the address decoders are chosen to optimize the placement of corresponding program object in Level-1 cache and minimize cache misses.

15. The apparatus as recited in claim 13, wherein the changeable mask values for the programmable address mask registers of the plurality of decoders are collectively chosen to minimize Level-1 cache conflicts among the program objects.

16. The apparatus as recited in claim 9, wherein each of the plurality of decoders associated with Level-1 cache is dedicated to a function or program segment.

17. The apparatus as recited in claim 16, wherein the changeable mask values for the programmable address mask registers associated with the address decoders are chosen to optimize the Level-1 cache memory accesses and minimize cache misses caused by the corresponding function or program segment.

18. The apparatus as recited in claim 16, wherein the changeable mask values for the programmable address mask registers of the plurality of decoders are collectively chosen to minimize the Level-1 cache memory conflicts among all program functions or segments.

19. The apparatus as recited in claim 9, wherein each of the decoders associated with the Level-1 cache is dedicated to a task whenever multiple programs or tasks are executed on a single processor.

20. The apparatus as recited in claim 19, wherein the changeable mask values for the programmable address mask registers associated with the address decoders are chosen to optimize the Level-1 cache memory accesses and minimize cache misses caused by the corresponding task or program.

21. The apparatus as recited in claim 19, wherein the changeable mask values for the programmable address mask registers of the decoders are collectively chosen to minimize the Level-1 cache memory conflicts among all program functions or segments.

22. An apparatus comprising:
two or more processors or cores;
a physical memory communicably coupled to the processor(s) or cores, wherein each location within the physical memory has a physical memory address;
one or more physical cache memories (Level 2 cache or Last Level Cache) communicably coupled to the processor(s) or core(s);
two or more address mappings associated with each physical Last Level Cache, wherein each of the two or more address mappings divide the physical memory address into at least a first set of address bits and a second set of address bits, the first set of address bits comprising a combination of two or more address bits from the physical memory address that are used as a set index to locate a program object in the physical cache memories, the second set of address bits are used as a tag to correctly identify a data in the physical cache memories with the physical memory address, a total number of bits used as the set index is less than a total number of bits in the physical memory address and the set index bits for the two or more address mappings are not identical;
an address decoder associated with each address mapping; and
a programmable address mask register with each address decoder that extracts (a) the set index from the physical memory address of the program object using changeable mask values which identify the address bits of the set index, and (b) the tag from the physical memory address of the program object using a complement of the changeable mask values which identify the address bits of the tag.

23. The apparatus as recited in claim 22, wherein each of the plurality of address decoders is dedicated to a processor or core.

24. The apparatus as recited in claim 22, wherein the changeable mask values for the programmable address mask registers of the decoders are collectively chosen to minimize the Level-2 or Last Level cache memory conflicts among all processor cores.

25. A method for protecting against a side channel attack comprising the steps of:
providing a physical memory, wherein each location within the physical memory has a physical memory address;
providing a physical cache memory;
dividing the physical cache memory into two or more virtual segments;
selecting an address mapping for each virtual segment wherein the address mapping divides the physical memory address into at least a first set of address bits and a second set of address bits, the first set of address bits comprising a combination of two or more address bits from the physical memory address that are used as a set index for the virtual segment to locate an object in the virtual segment, the second set of address bits are used as a tag to correctly identify a data in the virtual segment with the physical memory address, a total number of bits used as the set index is less than a total number of bits in the physical memory address and the set index is different for each virtual segment; and
providing a cache address decoder for each virtual segment to protect against the side channel attack wherein each physical cache address decoder comprises a programmable address mask register that (a) extracts the set index from the physical memory address to locate objects in the virtual segment using changeable mask values which identify the address bits of the set index, and (b) the tag from the physical memory address of the program object using a complement of the changeable mask values which identify the address bits of the tag.

26. The method as recited in claim 25, further comprising the step of choosing and/or changing the changeable mask values using a control software.

27. The method as recited in claim 25, further comprising the step of dedicating each cache address decoder to a specific function of a program, a different application, a different task, a different object of the program, a different process, a different thread in a multithreaded processor, or a different core in a multicore system.

28. The method as recited in claim 25, wherein:
one of the cache address decoders is dedicated to one or more encryption algorithms;
the selected address bits are not consecutive bits and are selected to increase a difficulty of predicting the address mapping;
a permutation table is not required;
the side channel attack comprises a Percival's Attack or a Bernstein's Attack; or
the physical cache memory comprises a L-1 cache, a L-2 cache, a L-3 cache, a LLC cache, a main memory or other type of memory.

29. The method as recited in claim 25, further comprising the step of randomly selecting the cache address decoders for different functions of a program, different applications, different tasks, different objects of the program, different processes, different threads in a multithreaded processor, or different cores in a multicore system.

30. The method as recited in claim 25, further comprising the step of changing the changeable mask values of the address mask register on a process context switch to increase a difficulty of predicting the address mapping.

31. The method as recited in claim 25, further comprising the step of obtaining a set number and a tag by performing two AND operations on an address using the mask and its complement.

32. The method as recited in claim 25, wherein the cache address decoders implement "skewed" associativity.

33. The method as recited in claim 25, wherein each segment is restricted to a fixed number of cache sets, each segment is allowed to encompass the cache memory in its entirety, or each segment is allowed to bleed into other segments when necessary.

34. The method as recited in claim 25, wherein at least one of the selected address bits is not a consecutive bit.

35. The apparatus as recited in claim 1, wherein at least one of the address bits used as the set index is not a consecutive bit.

36. The apparatus as recited in claim 9, wherein at least one of the address bits used as the set index is not a consecutive bit.

37. The apparatus as recited in claim 22, wherein at least one of the address bits used as the set index is not a consecutive bit.

38. An apparatus comprising:
one or more processors or cores;
a physical memory communicably coupled to the processor(s) or core(s), wherein each location within the physical memory has a physical memory address;
a physical cache memory communicably coupled to the processor(s) and the physical memory, the physical cache memory divided into at least a first virtual segment and a second virtual segment;
an address decoder for each virtual segment comprising at least a first address decoder for the first virtual segment and a second address decoder for the second virtual segment;
the first address decoder having a first programmable address mask register comprising a set of first bit positions wherein each first bit position contains a first changeable mask value that identifies an address bit of the first set index whenever the first changeable mask value is set to a first specified value and identifies an address bit of the first tag whenever the first changeable mask value is not set to the first specified value such that (a) the first set index is extracted from the physical memory address of a first program object to locate the first program object in the first virtual segment using the first changeable mask values that are set to the first specified value, and (b) the first tag is extracted from the physical memory address of the first program object in the first virtual segment using the first changeable mask values that are not set to the first specified value; and
the second address decoder having a second programmable address mask register comprising a set of second bit positions wherein each second bit position contains a second changeable mask value that identifies an address bit of the second set index whenever the second changeable mask value is set to a second specified value and identifies an address bit of the second tag whenever the second changeable mask value is not set to the second specified value such that (a) the second set index is extracted from the physical memory address of a second program object to locate the second program object in the second virtual segment using the second changeable mask values that are set to the second specified value, and (b) the second tag is extracted from the physical memory address of the second program object in the second virtual segment using the second changeable mask values that are not set to the second specified value.

39. The apparatus as recited in claim 9, wherein the changeable mask values are preset, selected at random, dynamically selected or selected based on one or more criteria.

40. The apparatus as recited in claim 22, wherein the changeable mask values for the programmable address mask registers associated with the address decoders are chosen to optimize the Level-2 or Last Level cache memory accesses and minimize cache misses caused by the corresponding processors (or cores).

41. The method as recited in claim 25, wherein the selection of the address mapping is determined by the changeable mask values which are preset, random, or based on one or more criteria.

42. The apparatus as recited in claim 35, wherein a portion of the set of first bit positions comprise at least one first bit position containing the first specified value followed by at least one first bit position not containing the first specified value followed by at least one first bit position containing the first specified value or a portion of the set of second bit positions comprise at least one second bit position containing the second specified value followed by at least one second bit position not containing the second specified value followed by at least one second bit position containing the second specified value.

43. The apparatus as recited in claim 9, wherein the changeable mask values are chosen and/or changed by a control software.

* * * * *